United States Patent [19]

Schmohe

[11] 4,035,679

[45] July 12, 1977

[54] COOLANT TRANSFER TUBE FOR DYNAMOELECTRIC MACHINES

[75] Inventor: James Stuart Schmohe, Rockford, Ill.

[73] Assignee: Sundstrand Corporation, Rockford, Ill.

[21] Appl. No.: 635,498

[22] Filed: Nov. 26, 1975

[51] Int. Cl.² ........................................ H02K 1/32
[52] U.S. Cl. ............................................... 310/61
[58] Field of Search .................. 310/59, 61, 64, 54, 310/90, 168

[56] References Cited

U.S. PATENT DOCUMENTS

| | | |
|---|---|---|
| 2,854,594 | 9/1958 | Philippovic .................. 310/90 UX |
| 3,480,810 | 11/1969 | Potter .............................. 310/61 X |
| 3,910,386 | 10/1975 | Stigall et al. .................. 310/168 X |

*Primary Examiner*—Donovan F. Duggan
*Attorney, Agent, or Firm*—Ted E. Killingsworth; Michael B. McMurry; William R. Peoples

[57] ABSTRACT

In a dynamoelectric machine having a source of coolant for applying coolant under pressure to the machine housing, a coolant transfer tube is provided for transferring the coolant from the machine housing to an internal passageway in the shaft. Both the housing and the shaft are provided with bearing surfaces that allow the transfer tube, with each end configured into a journal, to rotate independently of the housing and shaft.

8 Claims, 1 Drawing Figure

COOLANT TRANSFER TUBE FOR DYNAMOELECTRIC MACHINES

BACKGROUND OF THE INVENTION

The invention relates to dynamoelectric machine cooling systems and in particular, to dynamoelectric machines wherein coolant flows from a passage in the machine housing to an internal passageway in the shaft of the machine rotor.

In a number of prior art machines, a coolant transfer tube is provided to allow the coolant to flow under pressure from the machine housing to an internal passage in the rotor shaft. Normally, the transfer tube is secured to either the housing of the machine or to the rotor shaft. This arrangement generally requires a number of parts in addition to the tube, including a pin or other device for preventing the transfer tube from rotating with respect to the housing or shaft and an O-ring or some other sealing arrangement to prevent the coolant from escaping from the transfer tube into the machine. One of the principal disadvantages of this type of structure for high generators that are used, for example, in aircraft, is that the end of the transfer tube that is not secured will be rotating against a bearing surface at the same speed as the generator is rotating. In aircraft-type generators this can be on the order 12,000 rpm, which could result in significant wear of the bearing surfaces. In addition, securing one end of the tube to either the housing or the shaft results in a somewhat rigid structure which only permits very limited articulation or flexing of the tube as the generator's shaft flexes under load, thereby contributing to even more wear of the bearing surfaces. Thus, the securing of one end of the transfer tube to either the housing or the shaft results in increased bearing wear and the necessity for using fastening means with the attendant manufacturing and assembly cost of those parts.

SUMMARY OF THE INVENTION

It is therefore an object of the invention to provide a coolant transfer tube and associated structure for a dynamoelectric machine wherein the transfer tube is free to rotate independently of the machine housing and the machine shaft.

It is a further object of the inventon to provide a coolant transfer tube and associated structure for a dynamoelectric machine wherein the coolant transfer tube has journaled bearing surfaces on each end, which cooperate with bearing surfaces on the machine housing and shaft so as to provide an essentially coolant-tight seal and to permit the transfer tube to rotate independently of both the housing and the shaft.

It is an additional object of the invention to provide a coolant transfer tube for dynamoelectric machines having journaled bearing surfaces on each end that are slightly arcuate in shape which cooperate with bearing surfaces on the housing and in the shaft to provide a substantially coolant-tight seal wherein the arcuate shape of the bearing surfaces on the transfer tube permit limited articulation of the transfer tube with respect to the housing and shaft.

DETAILED DESCRIPTION OF THE INVENTION

Figure 1:
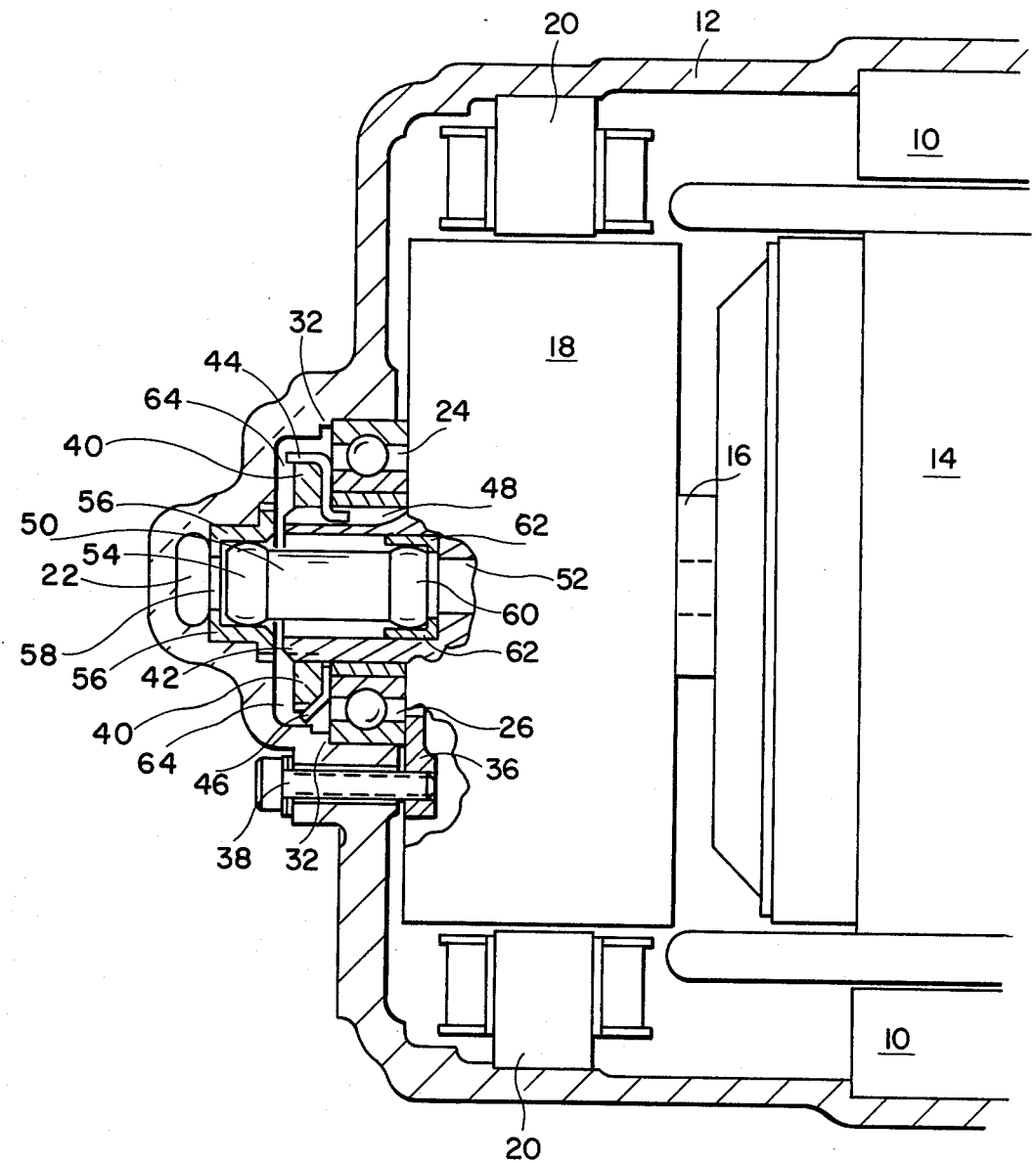
FIG. 1 is a sectional drawing of a coolant transfer tube and associated structure for a dynamoelectric machine.

A synchronous generator, as a representative example of a dynamoelectric machine, it illustrated in FIG. 1. As is conventional for synchronous generators, an armature coil structure, represented by the reference numeral 10, is attached to a generator housing 12 and a set of main field windings 14 rotate a shaft 16. A rotating exciter assembly 18 is also attached to the rotor shaft 16. Exciter field coils and their associated structure 20 are secured to the generator housing 12. The generator housing 12 is also configured at one end with a chamber 22 for receiving under pressure from an outside source (not shown) a supply of coolant which is preferably a cooling oil having lubricating as well as heating transfer characteristics.

The generator rotor shaft 16 is supported at the left-hand side of the housing 12 by means of a ball bearing which encompasses the shaft 16 as indicated by the reference numerals 24 and 26. One of the primary functins of the ball bearing is to support the rotor shaft and to allow shaft 16 to rotate freely. The outer race of the bearing is maintained in position by means of an annular shoulder 32 in the housing 12 in combinatin with a thrust plate 36 which in turn is secured to the housing 12 by means of a fastening device, such as a bolt or a screw 38. A spanner nut 40 is secured to the end of the shaft 16 by means of the threads 42 in order to keep the shaft 16 in the desired axial alignment with the generator housing 12. In the generator shown in FIG. 1, a tab washer, the upper portion which is indicated at 44, and the lower portion at 46, is interposed between the inner race of the ball bearing 24 and 26 and the spanner nut 40. The rotor shaft 16 is configured with a slot 48 which receives the foot of the tab washer 44 in order to prevent the washer and hence, the spanner nut 40, from rotating with respect to the shaft.

Also included in the left-hand portion of the generator structure is a coolant transfer tube 50 which serves to transmit the coolant from the chamber 22 to an internal coolant passage 52 of the shaft 16. The left-handdd side of the coolant tube 50 includes an integral journal bearing surface 54. The journal surface 54 is crowned or arcuate in shape, which is exaggerated slightly in the drawing for ease of understanding. The journal 54 rotates in a bearing 56 which is formed out of the left-hand portion of the generator housing 12. Bearing 56 also includes a shoulder to limit the axial movement of the transfer tube. In the generator shown in FIG. 1, the bearing 56 is formed of a bushing having superior wear characteristics over the metal used in the generator housing 12. The bushing 56 is includes an aperture 58 through which the coolant can flow from the chamber 22 through the transfer tube 50.

The right-hand portion of the transfer tube 50 is configured into a journal 60 which is also arcuate or slightly crowned in shape. The journal 60 cooperates with a bearing 62 in the interior of the shaft 16 so as to provide a journal bearing which will permit the transfer tube 50 to rotate freely with respect to the shaft 16. Bearing 62 has an inwardlly directly shoulder to limit axial movement of the transfer tube.

In the preferred embodiment of the invention, the journal surface 54 and 60 are machined under sufficient tolerances to provide an essentially coolant-tight seal between the journals 54 and 60 and the bearing surfaces 56 and 62. However, it is desirable to have a certain small proportion of coolant leak past the transfer tube journal bearings in order to provide a supply of coolant through the chamber 64 to the ball bearing 24 and 26. Providing the transfer tube journals 54 and 60 will arcuate or crowned surfaces allows the transfer tube 50 to move or articulate with respect to the alignment between the generator housing and the shaft 16. Under a number of operating conditions, including the application of a heavy load to the generator, the generator shaft 16 will have a tendency to flex slightly from its normal axial alignment. By allowing the transfer tube 50 to shift somewhat from its axial alignment, by providing the arcuate journal surfaces 54 and 60, wear on the journals can be reduced. In addition, by allowing the transfer tube 50 to rotate independently of both the generator housing 12 and the shaft 16, wear on the journal and bearings is further reduced. For example, assuming that the generator rotor shaft 16 is rotating at 12,000 rpm, the transfer tube 50 may only be rotating at 6000 rpm with respect to both the generator housing 12 and the shaft 16. Therefore, by allowing the transfer tube to rotate independently, bearing wear can be significantly reduced, the average rotational speed of the journals in the bearings will be less than the rotational speed of the shaft. Another advantage results from the fact that since the coolant transfer tube 50 is no longer securely attached to either the generator housing or the shaft 16, there is no longer need for extra parts such as a locking key or O-ring seals to provide securing means.

I claim:

1. In a rotating dynamoelectric machine having a rotor shaft with an internal passageway wherein coolant is transferred from the housing to the internal passage in the rotor shaft, a transfer tube assembly comprising:
   a coolant trasfer tube including a journal on each end;
   a first bearing, located in the machine housing in a bearing relation with the journal on one end of said transfer tube, configured to permit the transfer of coolant from the housing to one end of said transfer tube wherein said transfer tube is free to rotate with respect to the housing and forms a substantially liquid-tight seal in combination with said transfer tube journal; and
   a second bearing, located in the interior of the rotor shaft in a bearing relation with the journal on the other end of said transfer tube, configured to permit the transfer of coolant from said transfer tube to the rotor shaft internal passageway wherein said transfer tube is free to rotate with respect to the shaft, and forms a substantially liquid-tight seal in combination with said transfer tube bearing surface.

2. The assembly of claim 1 wherein each of said journals on each end of said transfer is configured with arcuate surfaces to permit limited articulation of said transfer tube.

3. The assembly of claim 2 wherein said first bearing is additionally configured with a shoulder to limit the axial movement of said transfer tube.

4. The assembly of claim 3 wherein said second bearing is additionally configured with a shoulder to limit the axial movement of said transfer tube.

5. The assembly of claim 4 additionally including:
   a bearing interposed between the housing and the rotor shaft to rotatably support the shaft;
   a thrust plate secured to said housing and abutting one side of the outer race of said bearing, effective to restrain the axial movement of said bearing;
   a spanner nut threadably secured to the end of the rotor shaft; and
   a tab washer interposed between said spanner nut and said other side of the inner race of said bearing and engaged with said rotor shaft effective to keep said spanner nut from rotating with respect to the rotor shaft wherein said spanner nut cooperates with said thrust plate to retain the shaft in axial position, thereby permitting retention of said transfer tube within both of said journal bearings.

6. In a rotating dynamoelectric machine having a rotor shaft with an internal passageway wherein coolant is transferred from the housing to the rotor shaft internal passageway, a transfer tube assembly comprising:
   means for rotatably mounting the rotor shaft in at least one end of the machine housing;
   a chamber in the machine housing for receiving the coolant from a coolant source;
   a coolant transfer tube having journals configured on each end;
   a first bearing integral with the machine housing and communicating with said chamber wherein one end of said transfer tube is freely rotatable within said first bearing;
   a second bearing integral with one end of said rotor shaft and communicating with the rotor shaft internal passageway, wherein the other end of said transfer tube is freely rotatable within said second bearing.

7. The assembly of claim 6 wherein the interface between each of said journals of said transfer tube and said bearings forms a substantially coolant-tight seal.

8. The assembly of claim 7 wherein said journal surfaces of said transfer tube are generally arcuate.

* * * * *

UNITED STATES PATENT AND TRADEMARK OFFICE
CERTIFICATE OF CORRECTION

PATENT NO. : 4,035,679
DATED : July 12, 1977
INVENTOR(S) : James Stuart Schmohe

It is certified that error appears in the above-identified patent and that said Letters Patent are hereby corrected as shown below:

Column 1, line 23, "high generators" should read -- high speed generators--
Column 1, line 27, "order 12,000" should read --order of 12,000--
Column 2, line 4, "it" should read --is--
Column 2, line 8, "rotate a" should read --rotate with a--
Column 2, line 21, "functins" should read --functions--
Column 2, line 24, "combinatin" should read --combination--
Column 2, line 43, "handdd" should read --hand--
Column 2, line 43, "coolant tube" should read --coolant transfer tube--
Column 2, line 53, "56 is includes" should read --56 includes--
Column 2, line 62, "directly" should read -- directed--
Column 2, line 65, "surface" should read --surfaces--
Column 3, line 5, "will" should read --with--
Column 3, line 17, "journal" should read -- journals--
Column 3, line 23, "reduced, the" should read --reduced, because the--
Column 3, line 37, "trasfer" should read --transfer--

Signed and Sealed this

Fourth Day of October 1977

[SEAL]

Attest:

RUTH C. MASON
*Attesting Officer*

LUTRELLE F. PARKER
*Acting Commissioner of Patents and Trademarks*